US008035936B2

(12) United States Patent
Erger et al.

(10) Patent No.: US 8,035,936 B2
(45) Date of Patent: Oct. 11, 2011

(54) MULTIPLE POLE ARC-FAULT CIRCUIT BREAKER USING SINGLE TEST BUTTON

(76) Inventors: Robert Erger, Swisher, IA (US); Issa Drame, Cedar Rapids, IA (US); Randall James Gass, Cedar Rapids, IA (US); Jeremy D. Schroeder, North Liberty, IA (US); Brett E. Larson, Cedar Rapids, IA (US)

( * ) Notice: Subject to any disclaimer, the term of this patent is extended or adjusted under 35 U.S.C. 154(b) by 536 days.

(21) Appl. No.: 12/272,895

(22) Filed: Nov. 18, 2008

(65) Prior Publication Data

US 2010/0123981 A1 May 20, 2010

(51) Int. Cl.
*H02H 3/00* (2006.01)

(52) U.S. Cl. .......................................................... 361/42

(58) Field of Classification Search ..................... 361/42
See application file for complete search history.

(56) References Cited

U.S. PATENT DOCUMENTS 6,215,378 B1 4/2001 Gibson et al. .................. 335/18
6,259,340 B1 7/2001 Fuhr et al. ...................... 335/18
6,285,534 B1 9/2001 Gibson et al. .................. 361/42
6,392,513 B1 5/2002 Whipple et al. ................ 335/18
6,426,634 B1 7/2002 Clunn et al. .................. 324/536
6,433,977 B1 8/2002 Macbeth ......................... 361/42
6,538,862 B1 * 3/2003 Mason et al. .................. 361/42
6,731,483 B2 * 5/2004 Mason et al. .................. 361/42

OTHER PUBLICATIONS

Eaton; "Loadcenters & Circuit Breakers Type CH Loadcenters & Circuit Breakers"; http://www.torinval-scia.com/b%20distribucion.pdf; Jan. 2003; pp. 20-26 (7 pages).
GE; "Bolt-on & Plug-in Arc-Fault Circuit Interrupters"; http://www.geindustrial.com/publibrary/checkout/Data%20Sheets%7CDET-204C%7Cgeneric; 2002; (2 pages).
Siemens; "2-Pole Arc-Fault Circuit Interrupters Plug-in & Bolt-on"; http://www2.sea.siemens.com/NR/rdonlyres/E4460AFB-E625-4689-B745-D40531FC613B/0/BranchFeederAFCI2Polefastfax.pdf; 2007; (2 pages).

* cited by examiner

*Primary Examiner* — Stephen W Jackson

(57) ABSTRACT

A multiple pole arc-fault circuit breaker includes a first pole assembly, a second pole assembly, a microprocessor, and a single test button. At least one of the first pole assembly and the second pole assembly has a trip mechanism. The microprocessor is electrically coupled to the first pole assembly and to the second pole assembly, and, in response to receiving a single test signal, is operative to perform electrical tests for both the first pole assembly and the second pole assembly. In response to successful completion of the electrical tests, the microprocessor is further operative to actuate the trip mechanism. The single test button is mounted to the housing and includes a single test position which causes the sending of the single test signal for initiating the electrical tests.

16 Claims, 6 Drawing Sheets

MULTIPLE POLE ARC-FAULT CIRCUIT BREAKER USING SINGLE TEST BUTTON

FIELD OF THE INVENTION

This invention is directed generally to electrical circuit breakers, and, more particularly, to a multiple pole arc-fault circuit breaker having a single position test button.

BACKGROUND OF THE INVENTION

Multiple pole (also referred to as "multi-pole") arc-fault circuit breakers are typically used in residential applications. Some current circuit breakers require periodic user-initiated testing, which is performed via a test button (also know as a push-to-test button or "PTT").

Current multi-pole circuit breakers require either a plurality of test buttons (e.g., one test button for each pole) or a single test button having multiple button positions (e.g., a single button having a first position for a first pole and a second position for a second pole). One problem associated with these types of circuit breakers is that they are unnecessarily complex, requiring additional parts and board space. Each test button requires additional hardware components for mounting the test button to the breaker housing and for coupling the test button to the breaker microcontroller. Thus, manufacturing costs and design considerations are unnecessarily increased. Similarly, a single test button having multiple positions requires additional hardware components and design considerations.

Some design considerations include selecting an appropriate size and position for components such as the circuit breaker microcontroller. One design consideration of the microcontroller is related to the required number of I/O inputs, which are selected based on the number of test buttons or test button positions. For example, the higher the number of test buttons or test button positions, the higher the pin count and cost of the microcontroller. As such, using a plurality of test buttons or a plurality of test button positions increases the cost and size of microcontroller. Furthermore, a larger-sized microcontroller generates additional heat and, accordingly, provides additional design problems related to removal of excess heat from the circuit breaker.

What is needed, therefore, is a multi-pole circuit breaker having a single position—single test button that addresses the above-stated and other problems.

SUMMARY OF THE INVENTION

In an implementation of the present invention, a multiple pole arc-fault circuit breaker includes a first pole assembly, a second pole assembly, a microprocessor, and a single test button. At least one of the first pole assembly and the second pole assembly has a trip mechanism. The microprocessor is electrically coupled to the first pole assembly and to the second pole assembly, and, in response to receiving a single test signal, is operative to perform electrical tests for both the first pole assembly and the second pole assembly. In response to successful completion of the electrical tests, the microprocessor is further operative to actuate the trip mechanism. The single test button is mounted to the housing and includes a single test position which causes the sending of the single test signal for initiating the electrical tests.

In an alternative implementation of the present invention, a multiple pole arc-fault circuit breaker includes a first pole assembly having a first trip mechanism. A second pole assembly is coupled to the first pole assembly and has a second trip mechanism. At least one housing encloses the first pole assembly and the second pole assembly. The circuit breaker further includes a microprocessor communicatively coupled to the first trip mechanism and the second trip mechanism. The microprocessor is operative to perform a plurality of tests for determining failure conditions associated with the first pole assembly and the second pole assembly. The microprocessor is further operative to actuate, i.e., trip, at least one of the first trip mechanism and the second trip mechanism, in response to successful completion of the tests. A single test button is mounted to the housing and has a protruding (actuator) part extending outwards from a surface of the housing. The single test button is movable between an off position and a test position by pressing the protruding part. A pair of contacts is mounted in the housing near the single test button, wherein the contacts are forced in electrical contact with each other when the single test button is moved to the test position. In the test position, the contacts cause a test signal to be sent to the microprocessor to initiate the plurality of tests.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
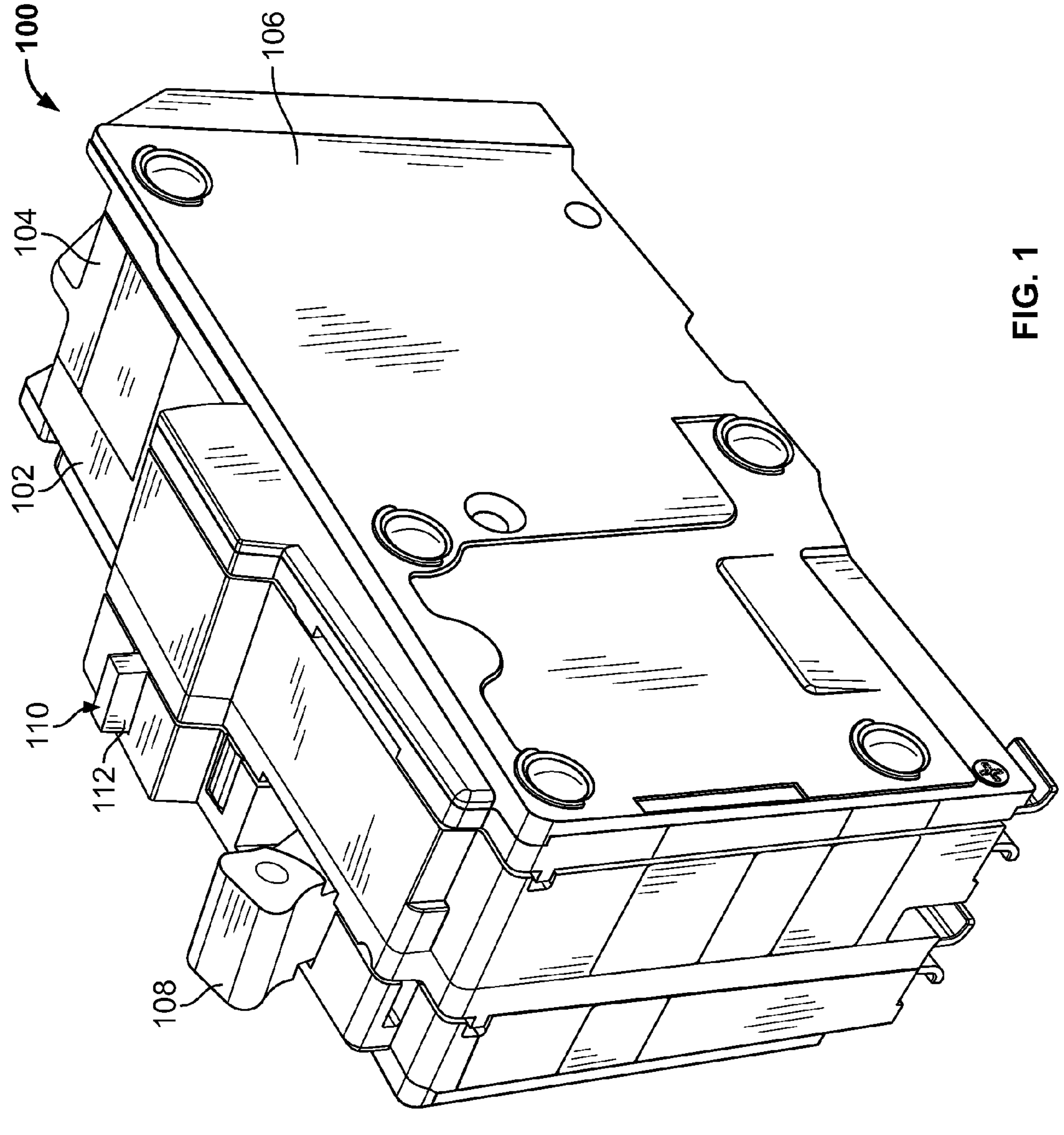
FIG. 1 is a perspective view of a multi-pole arc-fault circuit breaker, according to one embodiment.

Referring to FIG. 1, a multi-pole arc fault circuit breaker 100 includes a first pole housing 102, a second pole housing 104, and a housing cover 106. The first pole housing 102 is mounted directly to the second pole housing 104 and includes a handle 108 and a single test button 110. The first pole housing 102 encloses components of a first pole assembly and the second pole housing 104 encloses components of a second pole assembly.

The handle 108 protrudes through the first pole housing 102 and is generally used for resetting the circuit breaker 100. The handle 108 can also serve as a visual indication of the status of the circuit breaker 100 (e.g., tripped, on, off).

The test button 110 has a protruding portion 112 that extends from the first pole housing 102. The test button 110 is illustrated in one of its only two positions, which include an off position and a test position. To move the test button 110 between the off position and the test position, a user depresses the test button 110 towards the first pole housing 102.

The housing cover 106 is mounted directly to the second pole assembly 104. In alternative embodiments, the circuit breaker 100 can have a single housing for enclosing all the breaker poles. In other alternative embodiments, the second pole housing 104 can include an integrated housing cover.

Figure 2A:
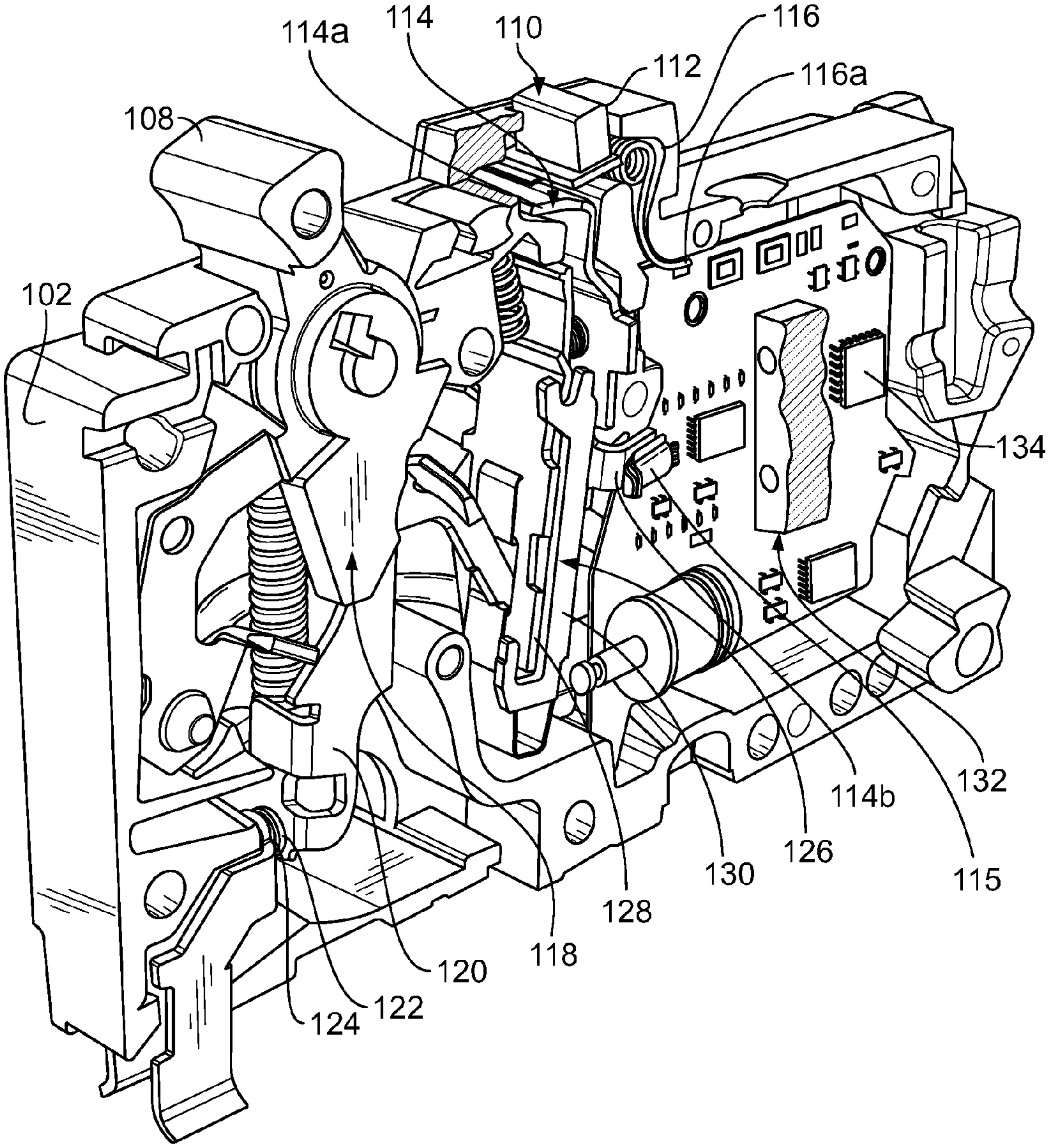
FIG. 2A is a perspective view of the circuit breaker of FIG. 1 showing internal components of a first pole.

Referring to FIG. 2A, the first pole housing 102 encloses a plurality of components including mechanical components (on the left side) and electrical circuitry (on the right side). The mechanical components include a test connector 114 and a test spring 116, both of which are generally positioned near the test button 110.

The test connector 114 includes a connector open end 114*a* below the test button 110 and a line end 114*b* electrically connected to a first line connector 115 (which is in contact with a first line for receiving current from a first contact of the circuit breaker 100). The test spring 116 includes a connected end 116*a* that mates to a circuit board 132.

Other mechanical components include a handle assembly 108 that is coupled to a movable blade 120 at the end of which is attached a movable contact 122. The movable contact is in direct contact with a fixed contact 124 when the circuit breaker 100 is in an "on" position of the circuit breaker 100 (i.e., when current is allowed to flow through the circuit breaker 100).

A trip mechanism 126 includes a magnetic trip armature 128 and an armature frame 130. In general, the trip mechanism 126 is the mechanism that drives a tripping action such as forcing the movable blade 120, and therefore the movable contact 122, away from the fixed contact 124. For example, the tripping action is caused by the presence of a higher current than the assigned current for the circuit breaker 100 over a specified period of time.

The electrical circuitry includes a circuit board 132 onto which numerous electrical components are mounted, including a microprocessor 134. The microprocessor 134 is operative to perform numerous tasks, including performing a plurality of electrical tests.

Figure 2B:
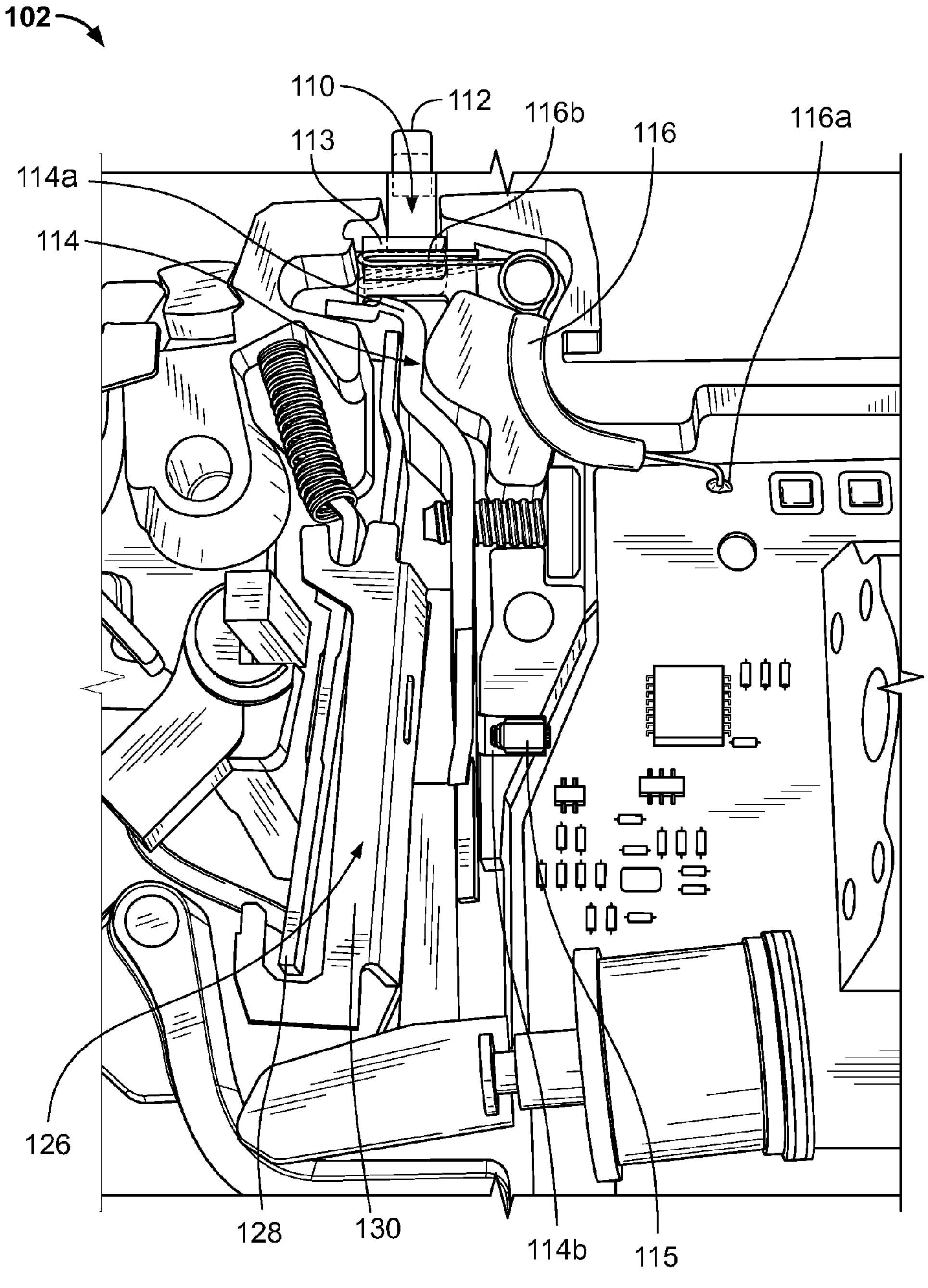
FIG. 2B is a perspective view showing a partial enlarged view of FIG. 2A.

Referring to FIG. 2B, the test button 110 further includes a bottom portion 113 that is enclosed within the first pole assembly 102. The test spring 116 further includes a spring open end 116*b* that is generally positioned below the bottom portion 113 of the test button 110 and above the connector open end 114*a*. The spring open end 116*b* and the connector open end 114*a* are the only pair of contacts that are placed in contact by the test button 110 to generate a single test initiation signal, which is received by the microprocessor 134.

When a user presses the test button 110 downward (towards the test connector 114), the bottom portion 113 forces the spring open end 116*b* in contact with the connector open end 114*a*. This mechanical movement of the test button 110 moves the test button 110 between the off position of the test button 110 (in which the test spring 116 and the test connector 114 are not in contact with each other) and the test position of the test button 110 (in which the test spring 116 and the test connector 114 are in contact with each other).

When the test button 110 is pressed in the test position, a single test signal is conveyed to a single pin of the microprocessor 134, which then initiates a circuitry test on critical system blocks across the plurality of poles in the breaker. According to one example, the circuitry test can be a microprocessor diagnostics test in which the microprocessor 134 generates a self-test signal that is compared to a response signal (e.g., a frequency response) to determine the general internal condition of the circuit breaker 100, including the condition of one or more of the microprocessor 134 and/or other circuit components.

Some exemplary critical system blocks include a voltage monitoring circuit, a ground fault circuit, a temperature sensing circuit, and a line current response circuit, as will be understood by the person of ordinary skill in the art. A voltage monitoring circuit test is performed on the circuit generally used to provide a scaled down reference voltage that is indicative of an AC line voltage, which can be interpreted by an electronic module. The line current response test, in general, verifies that a line current sensor and associated circuitry as found in the subject breaker are functioning within prescribed operational parameters, such as described in U.S. Pat. No. 7,253,637, of common ownership herewith.

Some examples of microprocessor diagnostics tests include testing of Random Access Memory (RAM), testing of Read Only Memory (ROM), verification of clocks, and execution of basic math operations. In another example, the microprocessor diagnostics test includes verification of a microprocessor's source code protection. Alternative to or in addition to the microprocessor diagnostics test, the microprocessor 134 can perform other circuitry tests (e.g., an arc fault test).

The microprocessor 134 further indicates the success or failure of the test in a manner perceptible to the user. One exemplary manner for indicating successful completion of all tests is to trip the circuit breaker 100. If all tests are not successful, the microprocessor 134 does not send a trip signal or the circuit breaker 100 does not trip.

Figure 3:
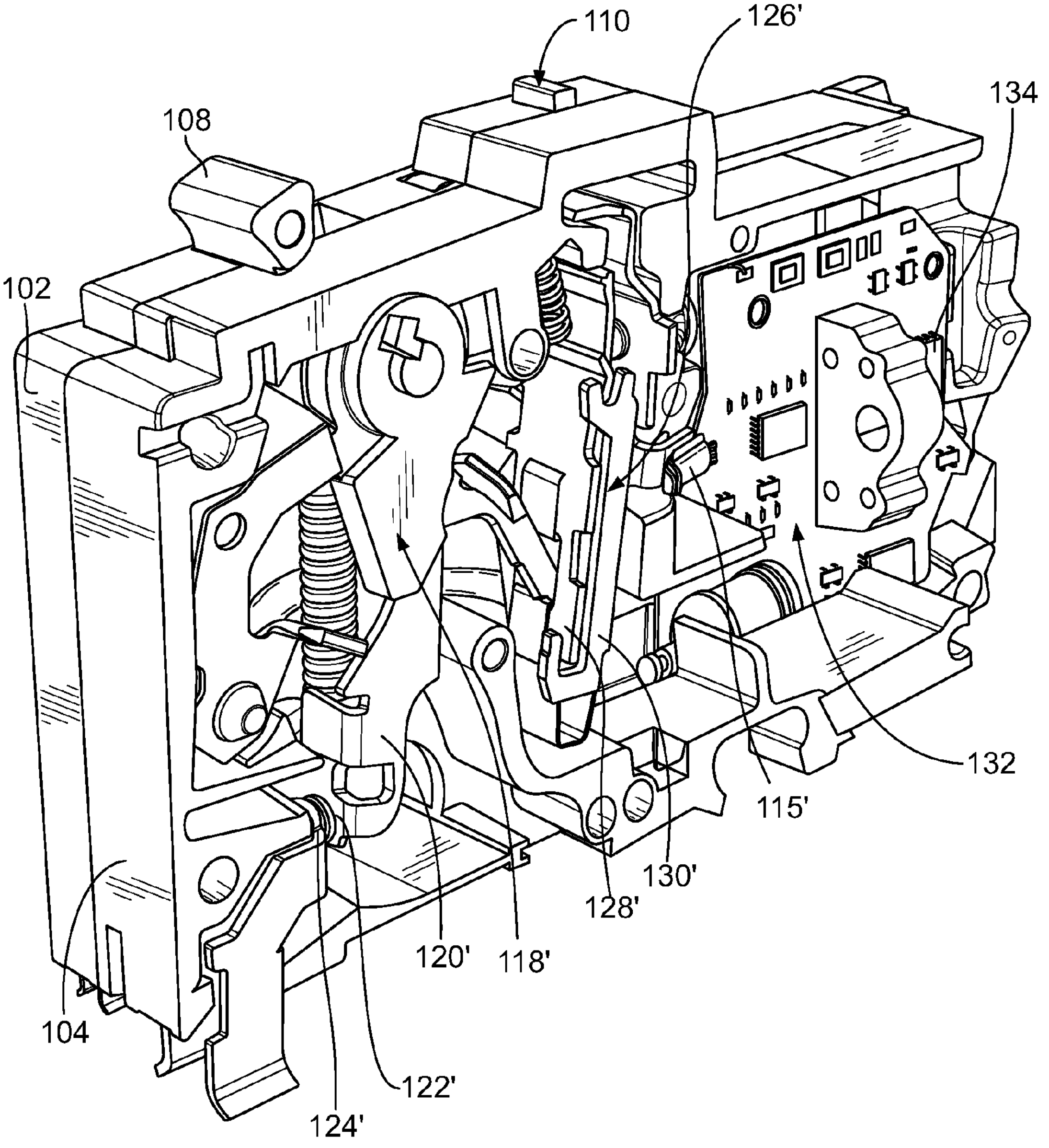
FIG. 3 is a perspective view of the circuit breaker of FIG. 1 showing internal components of a second pole.

Referring to FIG. 3, the second pole housing 104 includes mechanical components that are generally similar to the mechanical components of the first pole housing 102. For example, the second pole housing 104 includes a handle assembly 118' having a movable blade 120', a movable contact 122', and a movable contact 122'. The handle assembly 118' of the second pole assembly is coupled to the same handle 108 as the handle assembly 118 of the first pole assembly.

The second pole housing 104 further includes a trip mechanism 126', a magnetic trip armature 128', and an armature frame 130'. A second line connector 115' is positioned near the armature frame 130'. The second line connector 115' is in contact with a first line for receiving current from a first contact of the circuit breaker 100.

In addition to sharing the same handle 108, the second pole assembly also shares the circuit board 132 (including the microprocessor 134) with the first pole assembly. Furthermore, the second pole assembly does not include counterparts to the test button 110 or the test spring 116. The test signal generated in response to pressing the test button 110 initiates tests for all the pole assemblies (e.g., the first pole assembly and the second pole assembly).

Figure 4:
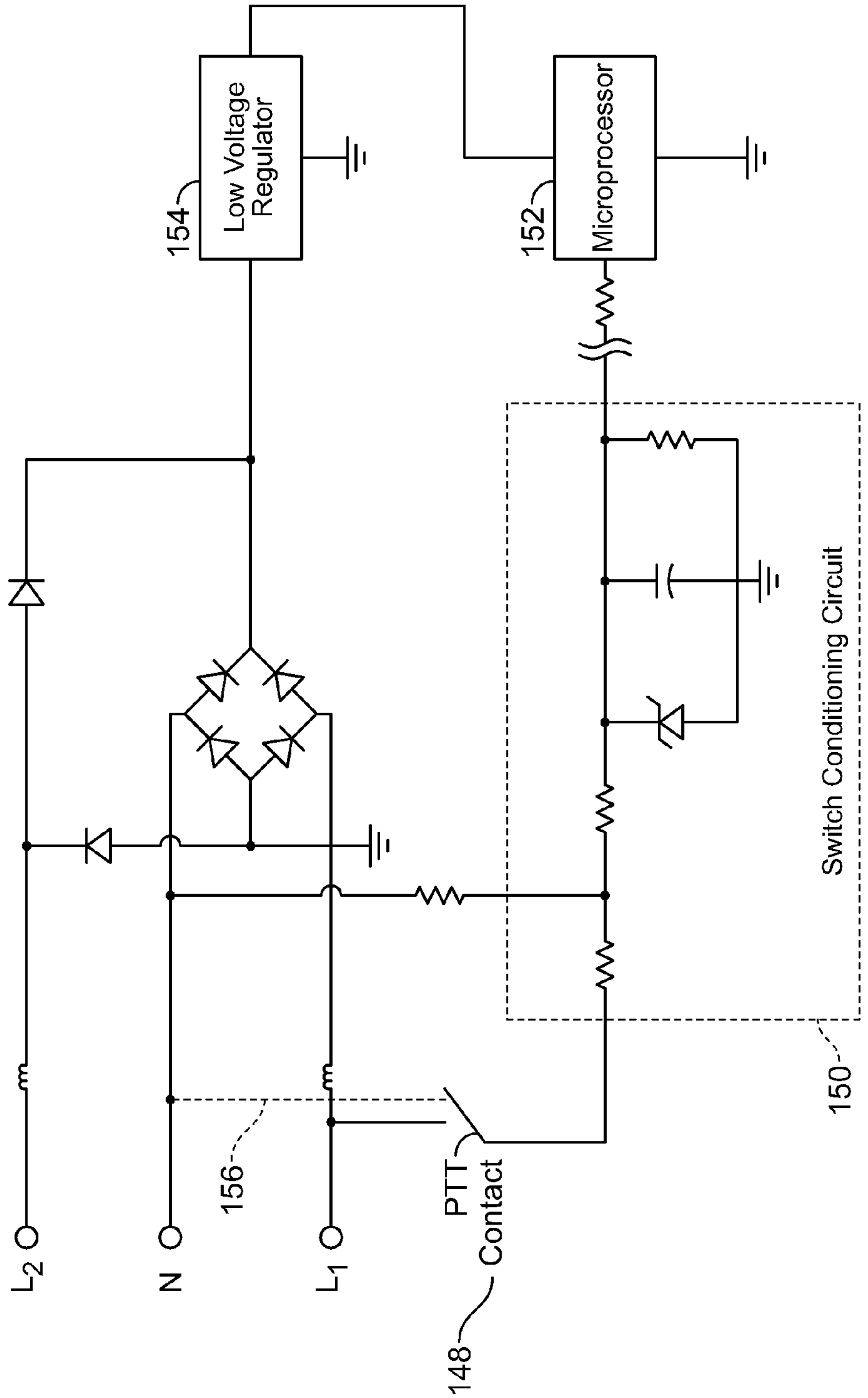
FIG. 4 is a circuit diagram illustrating electrical coupling of a test button to a microprocessor, according to another embodiment.

Referring to FIG. 4, a circuit diagram illustrates the circuit path associated with the test button 110. When the PTT Contact 148 is closed, test current flows through the circuit from line 1 and returns through line 2 applying full phase voltage across the test circuit, wherein a PTT Contact 148 has a PTT input line connected to line 1. The generated test signal passes through a switch conditioning circuit 150 and is received by a single pin of the microprocessor 152, which performs any necessary tests. A low voltage regulator 154 is also located on the circuit board 132.

Optionally, the primary current path for the test circuit can be connected between any one of the first line and the second line of the circuit breaker 100 and a neutral line of the circuit breaker 100. For example, an alternative line-neutral connection 158 illustrates the PTT input line being connected to the neutral line, instead of the being connected to the first line. One advantage associated with this alternative embodiment is that resistors in the current path of the test circuit will only receive 120V voltage, which can potentially allow using smaller resistors with lower pulse limit power ratings.

Figure 5:
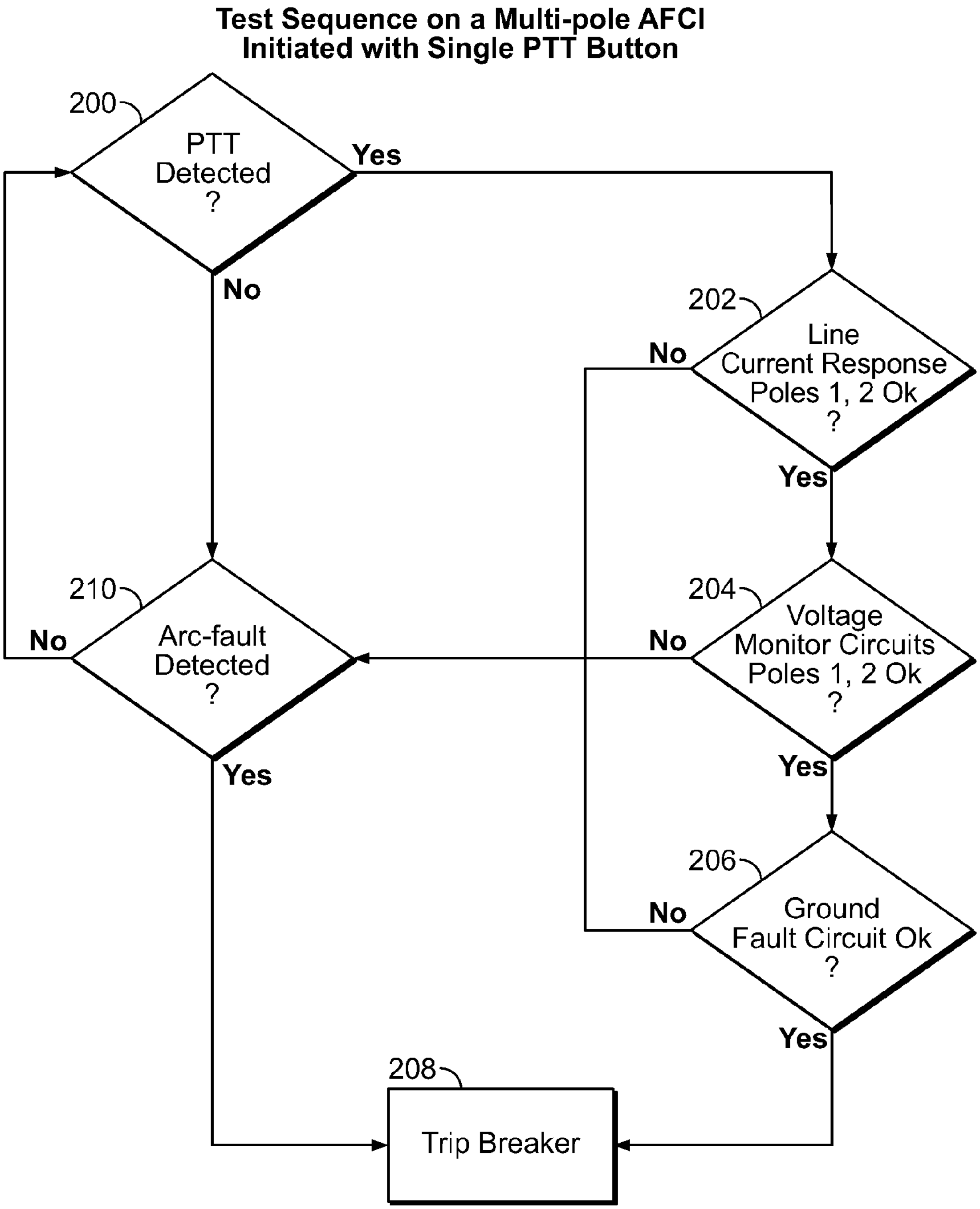
FIG. 5 is a flowchart illustrating a test sequence on the circuit breaker of FIG. 1, according to yet another embodiment.

Referring to FIG. 5, a flowchart illustrates the test sequence of the circuit breaker 100. If a Push-To-Test (PTT) command is received (200), a plurality of tests are performed by the microprocessor 134. The tests include, for example, determining whether the line current response of both poles of the assembly are functioning ok (202), whether voltage monitor circuits of both poles of the assembly are functioning ok (204), and whether a ground fault circuit is functioning ok (206). If all the tests are successful, the circuit breaker 100 is tripped (208).

If any of the tests fail, the circuit breaker 100 will exit the test sequence and return to its normal arc-fault detection mode (210) (e.g., the circuit breaker 100 will tend to trip if an arc-fault is detected). If the microprocessor 134 successfully concludes (or "passes") the tests, the circuit breaker 100 is tripped to indicate the successful conclusion of the tests. Thus, the customer becomes aware that the tests were successful if the circuit breaker is tripped after pushing the test button 110. Conversely, a failure of the tests is indicated by no response from the circuit breaker 100. For example, a customer becomes aware that the tests have failed if the circuit breaker 100 does not trip after pushing the test button 110. Throughout the testing, the circuit breaker 100 will continue to attempt to detect faults (210) and to protect any downstream electrical distribution systems.

In an alternative embodiment, a circuit breaker includes a daisy chain configuration in which the contact pair (e.g., the test spring 116 and the test connector 114) initiates the tests such that the poles are tested in succession, one at a time. Upon test completion, the pole under test sends a signal to a next pole in the daisy chain to begin testing, until the last pole is tested. The trip signal can be sent upon successful testing of all poles. Thus, according to this embodiment, the next pole in the daisy chain does not get tested if the tests fail for the initial pole. According to another embodiment, the next pole in the daisy chain is tested regardless of the outcome in the initial pole. However, the user is notified that at least one test has failed in one of the tested poles by, for example, failing to trip the circuit breaker.

In some current two-button and/or two-position systems, for example, each pole requires receiving its own test signal before initiating any pole related tests (e.g., first pole requires a first test signal, second pole requires a second test signal, etc.). The test signal is caused by a respective test button or test position. For example, a first button or a first test position (of a test button) causes the first test signal, a second button or a second test position (of the test button) causes the second test signal, etc. In contrast, the daisy chain approach replaces the need for the second button or the second test position by generating the second test signal in response to the successful completion of the tests associated with the first pole. When the tests associated with the first pole are successfully completed, the second test signal is generated and the tests associated with the second pole are initiated.

Furthermore, in some current two-button and/or two-position systems a separate button and/or position is required for testing separate functions (e.g., a first button is pressed to test an arc fault condition and a second button is pressed to test a ground fault condition). In another example, a user may have to press button A for testing the circuit breaker circuitry (i.e., perform a microprocessor diagnostics test) and button B for testing the ground fault. In contrast, the circuit breaker 100 of the current application can perform both kinds of tests with a single press of a single button.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A multiple pole arc-fault circuit breaker comprising:

a first pole assembly and a second pole assembly, at least one of the first pole assembly and the second pole assembly having a trip mechanism;

a microprocessor electrically coupled to the first pole assembly and to the second pole assembly, the microprocessor being operative to in response to receiving a single test signal, perform electrical tests for both the first pole assembly and the second pole assembly, and in response to successful completion of the electrical tests, actuate the trip mechanism; and a single test button mounted to the housing and including a single test position for sending the single test signal, the electrical tests being initiated in response to receiving the single test signal when the test button is positioned in the single test position.

2. The multiple pole arc-fault circuit breaker of claim 1, wherein the single test button is mechanically positioned in the first pole assembly.

3. The multiple pole arc-fault circuit breaker of claim 1, wherein the single test button includes only two mechanical positions, the two mechanical positions being the single test position and an off position.

4. The multiple pole arc-fault circuit breaker of claim 1, further comprising a circuit board for mounting the microprocessor, and a spring mounted in the first pole assembly, the spring having a first end proximate the single test button and a second end connected to the circuit board, the first end being movable between an open electrical position and a closed electrical position.

5. The multiple pole arc-fault circuit breaker of claim 4, wherein the closed electrical position of the spring is achieved in response to moving the single test button in the single test position, the open electrical position of the spring corresponding to an off position of the single test button.

6. The multiple pole arc-fault circuit breaker of claim 4, wherein the second end of the spring is electrically coupled to one of a first voltage line, a second voltage line, and a neutral line.

7. The multiple pole arc-fault circuit breaker of claim 1, wherein the electrical tests includes one or more of a line current response test, a voltage monitor circuits test, a ground fault circuit test, and a microprocessor diagnostics test.

8. The multiple pole arc-fault circuit breaker of claim 1, further comprising a movable member positioned near the single test button and being electrically conductive, the movable member having a first end coupled to a voltage line and a second end movable between an electrically coupled position and an electrically uncoupled position, the electrically coupled position corresponding to the single test position of the single test button; and a fixed member having a primary end positioned near the second end of the movable member such that the primary end is in contact with the second end of the movable member in the electrically coupled position, the fixed member having a secondary end electrically coupled to a line power connection.

9. The multiple pole arc-fault circuit breaker of claim 1, further comprising a first housing for enclosing the first pole assembly and a second housing for enclosing the second pole assembly, the single test button being mounted to and protruding in part from the first housing.

10. The multiple pole arc-fault circuit breaker of claim 1, wherein the single test button includes a protruding part extending away from a housing of the first pole assembly, the single test button being moved between an off position and the single test position by pushing the protruding part towards the housing.

11. A multiple pole arc-fault circuit breaker comprising:

a first pole assembly having a first trip mechanism;

a second pole assembly coupled to the first pole assembly and having a second trip mechanism;

at least one housing for enclosing the first pole assembly and the second pole assembly;

a microprocessor communicatively coupled to the first trip mechanism and the second trip mechanism, the microprocessor being operative to perform a plurality of tests for determining failure conditions associated with the first pole assembly and the second pole assembly, and in response to successful completion of the tests, actuate at least one of the first trip mechanism and the second trip mechanism;

a single test button mounted to the housing and having a protruding part extending outwards from a surface of the housing, the single test button being movable between an off position and a test position by pressing the protruding part; and a pair of contacts mounted in the housing near the single test button, the pair of contacts being forced in electrical contact with each other when the single test button is moved to the test position, the pair of contacts causing a test signal to be sent to a single pin of the microprocessor to initiate the plurality of tests.

12. The multiple pole arc-fault circuit breaker of claim 11, wherein a first one of the pair of contacts is electrically coupled to one of a first voltage line, a second voltage line, and a neutral line.

13. The multiple pole arc-fault circuit breaker of claim 11, wherein the microprocessor is mounted on a circuit board that is attached to the housing.

14. The multiple pole arc-fault circuit breaker of claim 11, wherein the failure conditions include detecting one or more of an arc-fault condition and a ground fault condition.

15. The multiple pole arc-fault circuit breaker of claim 11, wherein the plurality of tests includes one or more of a line current response test, a voltage monitor circuits test, and a microprocessor diagnostics test.

16. The multiple pole arc-fault circuit breaker of claim 11, wherein the microprocessor is further operative to perform tests associated with the first pole assembly first and, upon successful completion of the tests associated with the first pole assembly, perform tests associated with the second pole assembly.

* * * * *